(12) United States Patent
Fukuma et al.

(10) Patent No.: US 8,387,159 B2
(45) Date of Patent: Feb. 26, 2013

(54) SCANNING TYPE PROBE MICROSCOPE

(75) Inventors: Takeshi Fukuma, Ishikawa (JP); Yuji Mitani, Fukui (JP)

(73) Assignees: National University Corporation, Kanazawa-Shi (JP); Kanazawa University

( * ) Notice: Subject to any disclaimer, the term of this patent is extended or adjusted under 35 U.S.C. 154(b) by 175 days.

(21) Appl. No.: 13/060,373

(22) PCT Filed: Jul. 16, 2009

(86) PCT No.: PCT/JP2009/003365
§ 371 (c)(1),
(2), (4) Date: Mar. 24, 2011

(87) PCT Pub. No.: WO2010/023811
PCT Pub. Date: Mar. 4, 2010

(65) Prior Publication Data
US 2012/0151637 A1    Jun. 14, 2012

(30) Foreign Application Priority Data
Aug. 28, 2008   (JP) .................................. 2008-219456

(51) Int. Cl.
*G01N 13/16* (2006.01)
(52) U.S. Cl. ............. 850/7; 850/1; 850/2; 850/3; 850/4; 850/5
(58) Field of Classification Search ................... 850/1–7
See application file for complete search history.

(56) References Cited

U.S. PATENT DOCUMENTS
2008/0307864 A1   12/2008 Uchihashi et al.

FOREIGN PATENT DOCUMENTS

| JP | 2004-226237 A | 8/2004 |
|---|---|---|
| WO | 2007-072706 A1 | 6/2007 |
| WO | 2008-029561 A1 | 3/2008 |
| WO | 2008-029562 A1 | 3/2008 |
| WO | 2008-071013 A1 | 6/2008 |
| WO | WO2008071013 A1 * | 6/2008 |

OTHER PUBLICATIONS

International Search Report for PCT/JP2009/003365; Aug. 18, 2009.

* cited by examiner

*Primary Examiner* — Michael Maskell
(74) *Attorney, Agent, or Firm* — Pearne & Gordon LLP

(57) ABSTRACT

The present invention provides a fast-operating and stable scanning probe microscope configured to detect the interaction between a probe and a sample to avoid generation of a harmonic component. An oscillation circuit (31) generates an excitation phase signal indicative of the phase of an excitation signal. An excitation signal generation circuit (33) generates an excitation signal from the excitation phase signal. A complex signal generation circuit (35) generates a complex signal from a displacement signal. A vector calculation circuit (37) calculates the argument of the complex signal. A subtracting phase comparator (39) compares the argument with the phase of the excitation phase signal by subtraction. The amount of the interaction between a probe device and a sample is obtained using the subtracting phase comparator (39). The result of the comparison carried out by the subtracting phase comparator (39) may be output as a difference in phase between the displacement signal and the excitation signal. Moreover, a loop filter may be provided to form a phase locked loop, and a frequency signal may be provided which is indicative of a variation in the resonant frequency of the probe device.

10 Claims, 9 Drawing Sheets

SCANNING TYPE PROBE MICROSCOPE

RELATED APPLICATION

The present application claims the benefit of Japanese Patent Laid-Open No. 2008-219456 filed in Japan on Aug. 28, 2008, the contents of which are incorporated herein by reference.

TECHNICAL FIELD

The present invention relates to a scanning probe microscope, and in particular, to a technique for controlling excitation of a probe device and detecting the amplitude, phase, and frequency of vibration of the probe device.

BACKGROUND ART

A scanning probe microscope (SPM) brings a pointed probe close to a sample to detect the interaction between the probe and the sample (a tunnel current, an interactive force, or the like). The scanning probe microscope then feedback-controls the distance between the probe and the sample so as to keep the interaction constant. Moreover, the SPM scans the probe (or the sample) in the horizontal direction with the feedback control maintained. Thus, the probe (or the sample) moves up and down so as to trace recesses and protrusions on the sample. An image of the recesses and protrusions on the surface of the sample can be obtained by recording the track of the feedback scanning with respect to the horizontal position.

A known example of the SPM is an atomic force microscope (AFM). The AFM detects an interactive force acting between the probe and the sample. The AFM then feedback-controls the distance between the probe and the sample so as to keep the interactive force constant. The AFM uses a cantilever with a pointed probe provided at the tip thereof, as a force detector. When the probe is brought closer to the sample, the cantilever is displaced by the interactive force acting between the probe and the sample. This type of AFM configured to detect the interactive force based on the amount of displacement is called a contact mode AFM or a static mode AFM.

On the other hand, a type of AFM configured to mechanically excite the cantilever at a frequency close to the resonant frequency thereof is called a dynamic AFM. The dynamic AFM detects the interactive force acting between the probe and the sample, based on a variation in vibration amplitude, frequency, phase caused by the interactive force. AFMs detecting the interactive force using the amplitude, frequency, and phase are called an AM-AFM, an FM-AFM, and a PM-AFM, respectively.

The conventional dynamic mode AFM is disclosed in, for example, Japanese Patent Laid-Open No. 2004-226237. This document discloses an example of the FM-AFM.

FIG. 1 shows a general configuration of a dynamic mode AFM. An AFM 101 includes a cantilever 103, a sample stage 105, a scanner 107, and an excitation unit 109. The scanner 107 is, for example, a piezo actuator and moves a sample on the sample stage 105 in an X direction, a Y direction, and a Z direction to scan a sample and the cantilever 103 relative to each other. The excitation unit 109 is also, for example, a piezo actuator and excites the cantilever 103. For example, an amplifier configured to drive an actuator is omitted from FIG. 1.

An excitation and detection circuit 111 is configured to provide an excitation control function and a function to detect an interactive force. The excitation and detection circuit 111 applies an excitation signal to the excitation unit 109 to excite the cantilever 103. Furthermore, the excitation and detection circuit 111 detects, as the amount of the interaction between the probe and the sample, the amplitude, frequency, or phase of a displacement signal from the cantilever 103 detected by the sensor 113. The detected value is output to a feedback circuit 115 as a feedback signal and used to control the vertical position of the scanner 107. As a result, a feedback loop is formed which keeps the distance between the probe and the sample constant.

As described above, in the present specification, a circuit functioning as an excitation control circuit and an interaction detection circuit is referred to as the "excitation and detection circuit". Several types of methods are available for implementing the excitation and detection circuit. The excitation and detection circuit can be roughly classified into an analog type and a digital type. The digital type is now mainly used because the specifications of the digital type can be flexibly changed and because the digital type can implement complicated signal processing.

FIG. 2 shows an example of an implemented excitation and detection circuit of a conventional digital type. The configuration in FIG. 2 corresponds to the AM-AFM and the PM-AFM and generates an excitation signal and detects an amplitude signal and a phase difference signal. The amplitude signal indicates the vibration amplitude of the cantilever. The phase difference signal indicates the difference in phase between the excitation signal for the cantilever and a displacement signal from the cantilever.

As shown in FIG. 2, an excitation and detection circuit 121 includes a DDS (Direct Digital Synthesizer) 123 and a lock-in amplifier 125. The DDS 123 corresponds to an excitation control circuit. The lock-in amplifier 125 corresponds to a detection circuit for the amplitude and phase difference.

In FIG. 2, the DDS 123 generates an excitation signal $\cos(2\pi f t)$ that varies at an excitation frequency f. The DDS 123 holds sine-wave output values with respect to the phase, in the form of a lookup table. A sine wave signal is obtained by interpolating discreet values in the lookup table. The signal is not only output as the excitation signal for the cantilever but is also utilized as a reference signal for the lock-in amplifier 125 formed of a digital circuit.

The lock-in amplifier 125 is a two-phase digital lock-in amplifier. A displacement signal $A\cos(2\pi f t+\phi)$ from the cantilever is input to the lock-in amplifier 125. The excitation signal $\cos(2\pi f t)$ is also input to the lock-in amplifier 125 as the reference signal as described above.

The reference signal is input to a 90° phase shift circuit (for example, a Hilbert conversion circuit) and a delay circuit, which then convert the signal into $\sin(2\pi f t)$ and $\cos(2\pi f t)$, respectively. These signals are converted into $X=A\cos(\phi)$ and $Y=A\sin(\phi)$, respectively, through a multiplication circuit and an LPF (Low Pass Filter). The multiplication circuit multiples each of the signals by the input displacement signal $A\cos(2\pi f t+\phi)$. The LPF removes high frequency components from the signals.

Then, a vector calculation circuit calculates the absolute value R and argument $\theta$ of a complex input $X+jY$. The absolute value R is $(X^2+Y^2)^{1/2}$, and the argument $\theta$ is $\tan^{-1}(Y/X)$. The absolute value R corresponds to the amplitude A of the displacement signal. The argument $\theta$ corresponds to the phase difference $\phi$ between the displacement signal and the excitation signal. Thus, R and $\theta$ are output as the amplitude signal A and the phase difference signal $\phi$, respectively.

The configuration in FIG. 2 corresponds to an AM-AFM mode and a PM-AFM mode. In the AM-AFM mode, the amplitude signal A is output as a feedback signal and used for feedback control. The feedback control is performed such that the amplitude signal A equals a target amplitude. In the PM-ADM mode, the phase difference signal φ is output as a feedback signal and used for feedback control. In this case, the feedback control is performed such that the phase difference signal φ equals a target phase difference.

Now, the configuration of the excitation and detection circuit for the FM-AFM will be described with reference to FIG. 3 and FIG. 4. FIG. 3 is a diagram based on which the principle of the FM-AFM will be described, and illustrates the characteristics of amplitude and phase of the cantilever. In an upper graph in FIG. 3, the axis of abscissas indicates frequency, and the axis of ordinate indicates the amplitude of the cantilever. In a lower graph in FIG. 3, the axis of abscissas indicates the frequency, and the axis of ordinate indicates the difference in phase between the excitation signal for the cantilever and displacement signal from the cantilever.

As shown by a dotted line in the upper graph in FIG. 3, the resonant frequency f of the cantilever varies (shifts) as a result of the interaction between the cantilever and the sample. In FIG. 3, the amount of variation in resonant frequency is indicated by Δf. Furthermore, as shown in the lower graph, when the cantilever vibrates at the resonant frequency, the phase difference φ between the excitation signal and the displacement signal is 90°. Thus, the FM-AFM sets a target value for the phase difference φ to 90°, and controls the excitation signal such that the phase difference φ equals the target value. This excitation control is achieved by a phase locked loop (PLL) circuit and is such that even if the resonant frequency of the cantilever is varied by the interaction, the cantilever continues to vibrate at the resonant frequency. During this control, a variation in resonant frequency Δf is detected. Then, the feedback control is performed so as to keep the variation in resonant frequency Δf constant.

FIG. 4 shows an example of an implemented excitation and detection circuit corresponding to the FM-AFM. The excitation and detection circuit generates an excitation signal and detects a frequency signal. The frequency signal is indicative of a variation in the resonant frequency of the cantilever caused by the interaction between the cantilever and the sample as described above.

As shown in FIG. 4, an FM-AFM excitation and detection circuit 131 includes a proportional integral (PI) control circuit 137 in addition to a DDS 133 and a lock-in amplifier 135 (two-phase digital lock-in amplifier).

An excitation signal $\cos(2\pi ft)$ output by the DDS 133 is input to the lock-in amplifier 135 as a reference signal. Furthermore, a displacement signal $A\cos(2\pi ft+\phi)$ from the cantilever is input to the lock-in amplifier 135. The lock-in amplifier 135 has a configuration similar to that of the lock-in amplifier 125 in FIG. 2 to output the phase difference φ between the excitation signal and the displacement signal. Here, the lock-in amplifier 135 functions as a multiplying phase comparator to perform phase comparison based on multiplication of the displacement signal.

A phase difference φ generated by the lock-in amplifier 135 is input to a PI control circuit 137. The PI control circuit 137 controls an output $2\pi\Delta fT$ (reference character T denotes a sampling period for input and output signals) such that the input phase difference φ equals a target value φ0. The output $2\pi\Delta fT$ is input to the DDS 133 to vary the frequency f of an output signal (excitation signal) $\cos(2\pi ft)$ of the DDS 133. The frequency f varies around the free-running frequency f0 (an oscillation frequency obtained when the input is 0) of the DDS by Δf.

In the configuration in FIG. 4, the DDS 133, the lock-in amplifier 135, and the PI control circuit 137 form the phase locked loop (PLL) circuit. The PI control circuit 137 functions as a loop filter for the PLL circuit. The PLL circuit varies the value of the frequency f of the excitation signal so that the frequency of the displacement signal equals that of the excitation signal, that is, $f=f0+\Delta f$. Thus, an output value from the PI control circuit 137 is proportional to a variation in the frequency of the displacement signal. Thus, the output value from the PI control circuit 137 is output as the frequency signal.

Furthermore, the difference in phase between the displacement signal and the excitation signal can be adjusted by varying the target value φ0 for the PI control circuit 137. As described with reference to FIG. 3, the FM-AFM sets the target phase difference to 90°. Thus, the phase difference φ is kept at 90°, and the cantilever vibrates at the resonant frequency. Even if the resonant frequency of the cantilever is varied by the interaction between the cantilever and the sample, the cantilever continues to vibrate at the resonant frequency. The frequency signal has a value indicative of a variation (shift) Δf in the resonant frequency of the cantilever. The frequency signal is used for feedback control.

The conventional AFM excitation and detection circuit has been described. There is still room to improve of the conventional circuit configuration as described below.

In the conventional technique illustrated in FIG. 2, the lock-in amplifier functions as a multiplying phase comparator and internally compares the excitation signal with the displacement signal by multiplication. This leads to generation of an unwanted harmonic component. More specifically, an output from the multiplication circuit in the lock-in amplifier contains a component of the difference in frequency between input signals and a component of the sum of the frequencies of the input signals. The sum component corresponds to the unwanted harmonic component. The harmonic component cannot completely be removed even by the LPF arranged after the lock-in amplifier. Such a residual harmonic component may not only distort an output waveform but also affect the feedback control as described below.

The AFM forms a feedback loop for control of the probe-sample distance, and the excitation and detection circuit is present in the feedback loop as shown in FIG. 1. A signal in which the harmonic component is mixed in the lock-in amplifier is used in the feedback loop. In this case, a feedback gain needs to be limited to a small value in order to avoid oscillation at the frequency of the harmonic component. This conventionally constitutes a factor preventing quick and stable feedback control from being achieved.

In the FM-AFM circuit configuration shown in FIG. 4, as is the case with the circuit in FIG. 2, the lock-in amplifier functions as a multiplying phase comparator, leading to generation of an unwanted harmonic component. In particular, in the FM-AFM, the harmonic component not only limits the feedback gain but also works against the PLL circuit. This will be described below.

In the FM-AFM configuration shown in FIG. 4, the lock-in amplifier is a part of the PLL circuit. Thus, the lock-in amplifier (multiplying phase comparator) generates an unwanted harmonic component in the loop in the PLL circuit. The harmonic component cannot completely be removed even by the LPF arranged after the lock-in amplifier. In particular, the LPF is present in the loop in the PLL and is thus subject to another restriction; the LPF cannot be designed independently of the response characteristics of the PLL. Thus, removal of the harmonic component in the FM-AFM is more difficult than in the AM-AFM and the PM-AFM. Because of the residual harmonic component, an increase in the gain of the PLL causes the PLL circuit to oscillate at the frequency of the residual harmonic component. Thus, in the conventional technique, the gain of the PLL is limited, preventing the frequency from being detected quickly and stably.

As described above, in the FM-AFM, disadvantageously, the harmonic component limits not only the feedback gain of the whole AFM but also the gain of the PLL.

SUMMARY OF INVENTION

Technical Problem

The present invention has been developed in the above-described circumstances. An object of the present invention is to provide a scanning probe microscope configured to be able to avoid generation of a harmonic component in detection of the interaction between a probe and a sample and thus to avoid problems attributed to the harmonic component.

An object of the present invention is to provide a fast-operating and stable scanning probe microscope configured to avoid generation of a harmonic component to enable an increase in feedback gain in the feedback control of a probe-sample distance.

An object of the present invention is to provide a scanning probe microscope configured to avoid generation of a harmonic component to enable an increase in the gain of a PLL, allowing a faster-operating PLL circuit to be provided therein.

Solution to Problem

A scanning probe microscope according to an aspect of the present invention comprises a probe device, an excitation unit configured to excite the probe device, a sensor configured to detect a displacement signal from the probe device, a feedback circuit configured to perform feedback control so as to keep interaction between the probe device and a sample constant, and an excitation and detection circuit configured to generate an excitation signal controlling excitation carried out by the excitation unit and to detect, for feedback control, an interaction amount indicative of the interaction based on the displacement signal, the excitation and detection circuit comprising an oscillation circuit configured to generate an excitation phase signal indicative of a phase of the excitation signal, an excitation signal generation circuit configured to generate the excitation signal based on the excitation phase signal, a complex signal generation circuit configured to generate a complex signal based on the displacement signal, a vector calculation circuit configured to calculate an argument of the complex signal by vector calculation, and a subtracting phase comparator configured to compare the phase of the argument with the phase of the excitation phase signal by subtraction, and a signal for the interaction amount obtained using the subtracting phase comparator is supplied to the feedback circuit.

A scanning probe microscope according to an aspect of the present invention comprises a probe device, an excitation unit configured to excite the probe device, a sensor configured to detect a displacement signal from the probe device, a feedback circuit configured to perform feedback control so as to keep constant a difference in phase between an excitation signal and the displacement signal whose difference varies depending on interaction between the probe device and a sample, and an excitation and detection circuit configured to generate the excitation signal controlling excitation carried out by the excitation unit and to detect, for feedback control, a phase difference signal indicative of the phase difference based on the displacement signal, the excitation and detection circuit comprising an oscillation circuit configured to generate an excitation phase signal indicative of a phase of the excitation signal, an excitation signal generation circuit configured to generate the excitation signal based on the excitation phase signal, a complex signal generation circuit configured to generate a complex signal based on the displacement signal, a vector calculation circuit configured to calculate an argument of the complex signal by vector calculation, and a subtracting phase comparator configured to compare the phase of the argument with the phase of the excitation phase signal by subtraction to generate a phase difference signal.

A scanning probe microscope according to an aspect of the present invention comprises a probe device, an excitation unit configured to excite the probe device, a sensor configured to detect a displacement signal from the probe device, a feedback circuit configured to perform feedback control so as to keep constant a variation in frequency of the displacement signal corresponding to interaction between the probe device and a sample, and an excitation and detection circuit configured to generate an excitation signal controlling excitation carried out by the excitation unit and to detect, for feedback control, a frequency signal indicative of the variation in frequency based on the displacement signal, the excitation and detection circuit comprising an oscillation circuit configured to generate an excitation phase signal indicative of a phase of the excitation signal, an excitation signal generation circuit configured to generate the excitation signal based on the excitation phase signal, a complex signal generation circuit configured to generate a complex signal based on the displacement signal, a vector calculation circuit configured to calculate an argument of the complex signal by vector calculation, a subtracting phase comparator configured to compare the phase of the argument with the phases of the excitation phase signal and a predetermined phase offset by subtraction, and a loop filter configured to form a phase locked loop circuit together with the oscillation circuit and the subtracting phase comparator, and the phase locked loop circuit controls the oscillation circuit so that a difference in phase between the argument and the excitation phase signal equals the predetermined phase offset and the excitation and detection circuit supplies the frequency signal obtained by the phase locked loop to the feedback circuit.

A scanning probe microscope according to an aspect of the present invention comprises a probe device, an excitation unit configured to excite the probe device, a sensor configured to detect a displacement signal from the probe device, a feedback circuit configured to perform feedback control so as to keep constant an amplitude of the displacement signal varying depending on interaction between the probe device and a sample, and an excitation and detection circuit configured to generate an excitation signal controlling excitation carried out by the excitation unit and to detect, for feedback control, an amplitude signal indicative of amplitude based on the displacement signal, the excitation and detection circuit comprising an oscillation circuit configured to generate an excitation phase signal indicative of a phase of the excitation signal, an excitation signal generation circuit configured to generate the excitation signal based on the excitation phase signal, a complex signal generation circuit configured to generate a complex signal based on the displacement signal, and a vector calculation circuit configured to calculate an absolute value of the complex signal which serves as the amplitude signal for the displacement signal.

An aspect of the present invention provides a method for controlling a scanning probe microscope configured to control excitation of a probe device by an excitation signal, detect a displacement signal for the probe device, and perform feedback control so as to keep interaction between the probe device and a sample constant based on the displacement signal, the method comprising generating an excitation phase signal indicative of a phase of the excitation signal, generating the excitation signal based on the excitation phase signal, generating a complex signal based on the displacement signal, calculating an argument of the complex signal by vector calculation, processing the argument and the excitation phase signal using a subtracting phase comparator, and performing feedback control using an interaction amount obtained using the subtracting phase comparator and which is indicative of the interaction.

Advantageous Effects of Invention

The present invention can avoid generation of a harmonic component in detection of the interaction between the probe and the sample, enabling problems attributed to the harmonic component to be avoided.

An advantage of the present invention is that generation of a harmonic component is avoided to enable an increase in feedback gain in the feedback control of the probe-sample distance, thus providing a fast-operating and stable scanning probe microscope.

An advantage of the present invention is that generation of a harmonic component is avoided to enable an increase in the gain of a PLL, thus allowing a faster-operating PLL circuit to be provided in the scanning probe microscope.

As described below, the present invention includes other aspects. Thus, the disclosure of the present invention is intended to provide some aspects of the present invention but not to limit the scope of the invention described and claimed herein.

DESCRIPTION OF EMBODIMENTS

Figure 1:
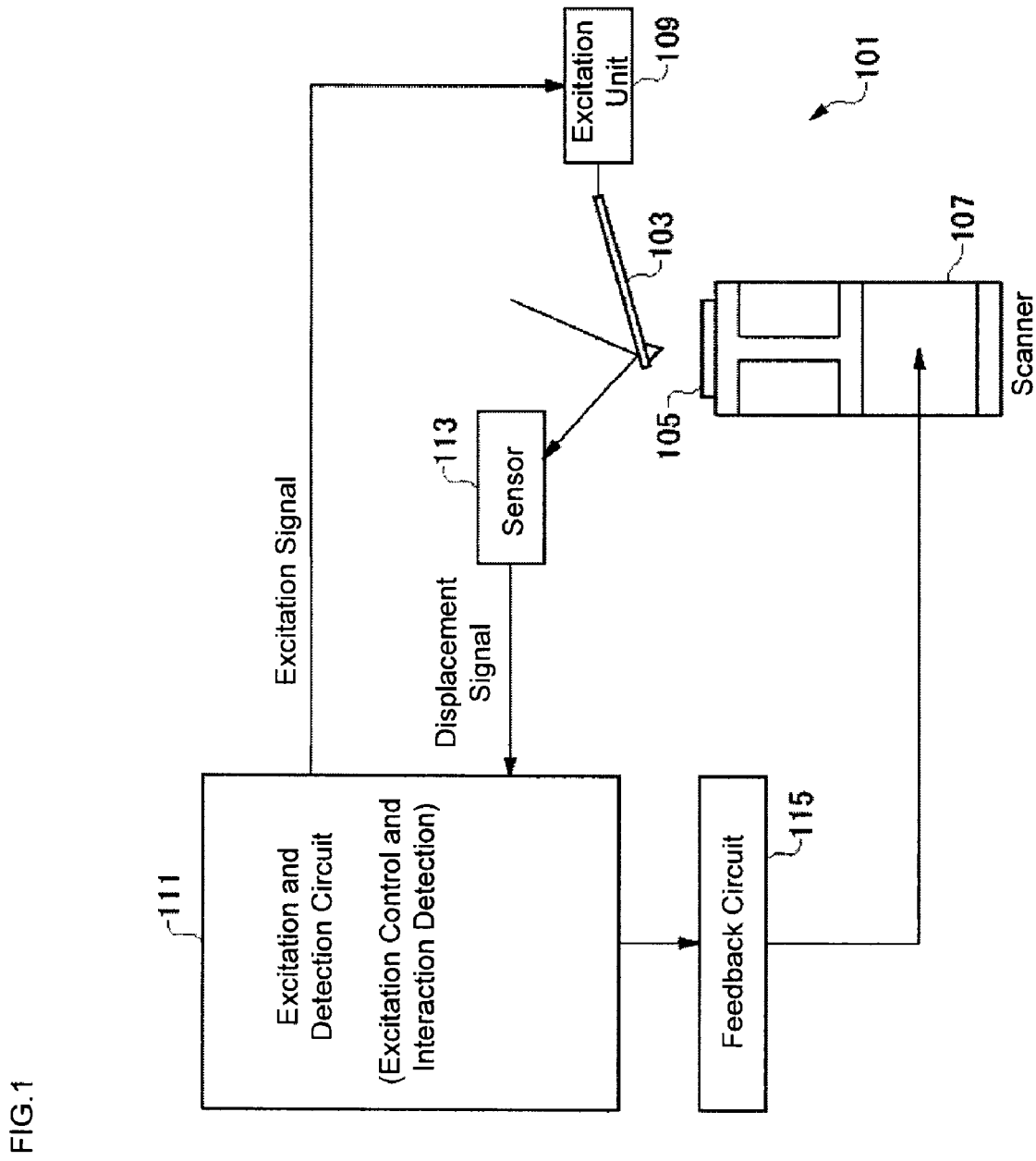
FIG. 1 is a diagram showing a general configuration of a dynamic AFM.

The present invention will be described below in brief. The description below and the accompanying drawings are not intended to limit the present invention. Instead, the scope of the present invention is defined by the accompanying claims.

In a scanning probe microscope (SPM) according to the present invention, an excitation and detection circuit includes a subtracting phase comparator used to obtain an interaction amount used for feedback control, as described above. The excitation and detection circuit avoids allowing a multiplying phase comparator to carry out multiplication in detecting an interaction amount, thus preventing generation of a harmonic component that may result from the multiplication. Hence, problems attributed to the harmonic components can be avoided.

Furthermore, the subtracting phase comparator may compare an argument with an excitation phase signal to generate a phase difference signal for an excitation signal and a displacement signal. The excitation and detection circuit may supply the phase difference signal to a feedback circuit as an interaction amount.

In this configuration, the subtracting phase comparator generates a phase difference signal. The use of multiplying phase comparison is avoided to prevent a harmonic component from being generated. Thus, a feedback gain in the feedback control of a probe-sample distance can be increased, providing a fast-operating and stable SPM. This configuration is suitable for a PM-AFM, for example.

Furthermore, the excitation and detection circuit may include a loop filter configured to form a phase locked loop circuit together with an oscillation circuit and a subtracting phase comparator. The phase locked loop circuit may control the oscillation circuit so that the difference in phase between the argument and the excitation phase signal equals a predetermined phase offset, and may generate a frequency signal obtained by a phase locked loop and which is indicative of a variation in the frequency of a displacement signal. The excitation and detection circuit may supply a frequency signal to a feedback circuit as the interaction amount. The subtracting phase comparator may compare the argument with the excitation phase signal and the phase offset by subtraction. The loop filter may generate a frequency signal based on an output from the subtracting phase comparator. The frequency signal may be used by the oscillation circuit and for the feedback control.

In this configuration, a phase locked loop (PLL) circuit including the subtracting phase comparator generates a frequency signal. Generation of a harmonic component that may result from multiplying phase comparison is prevented, enabling an increase in feedback gain in the feedback control of the probe-sample distance. Thus, a fast-operating and stable SPM can be provided. Moreover, the loop gain of the PLL circuit can be increased, allowing a faster-operating PLL circuit to be provided in the SPM. This configuration is suitable for an FM-AFM, for example.

Furthermore, a vector calculation circuit may calculate the absolute value of a complex signal which serves as an amplitude signal for the displacement signal. The excitation and detection circuit may supply the amplitude signal to the feedback circuit as an interaction amount.

In this configuration, the amplitude signal is generated without the use of a multiplying phase comparator. Thus, the feedback gain in the feedback control of the probe-sample distance can be increased, providing a fast-operating and stable SPM. This configuration is suitable for an AM-AFM, for example.

Furthermore, the SPM according to the present invention may include a first frequency conversion circuit configured to convert the frequency of the displacement signal before the excitation and detection circuit caries out processing, and a second frequency conversion circuit configured to convert the frequency of the excitation signal generated by the excitation and detection circuit. The second frequency conversion circuit may perform conversion opposite to that carried out by the first frequency conversion circuit. The first frequency conversion circuit may be called a preprocess conversion circuit. The second frequency conversion circuit may be called an excitation frequency conversion circuit.

In this configuration, the frequency of the displacement signal is converted before the excitation and detection circuit carries out processing. Then, the frequency conversion opposite to that performed before the processing is carried out on the excitation signal. Thus, the excitation and detection circuit can be applied to a probe device with a wider range of resonant frequencies.

A preferred embodiment of the present invention will be described below with reference to the drawings.

In the present embodiment, the scanning probe microscope (SPM) is an atomic force microscope (AFM). However, the present invention is not limited to the AFM. The present invention may be applied to other types of SPMs.

Furthermore, the probe device is a component used in the SPM and includes a probe. In the present embodiment, a cantilever includes the probe and thus corresponds to the probe device. However, in a certain known SPM, the probe is not supported by a probe support such as the cantilever. In such an SPM, the probe alone corresponds to a probe device. For example, in a scanning near-field optical microscope (SNOM), a pointed optical fiber serves as a probe and is used alone. In this case, the optical fiber probe corresponds to a probe device.

Figure 5:
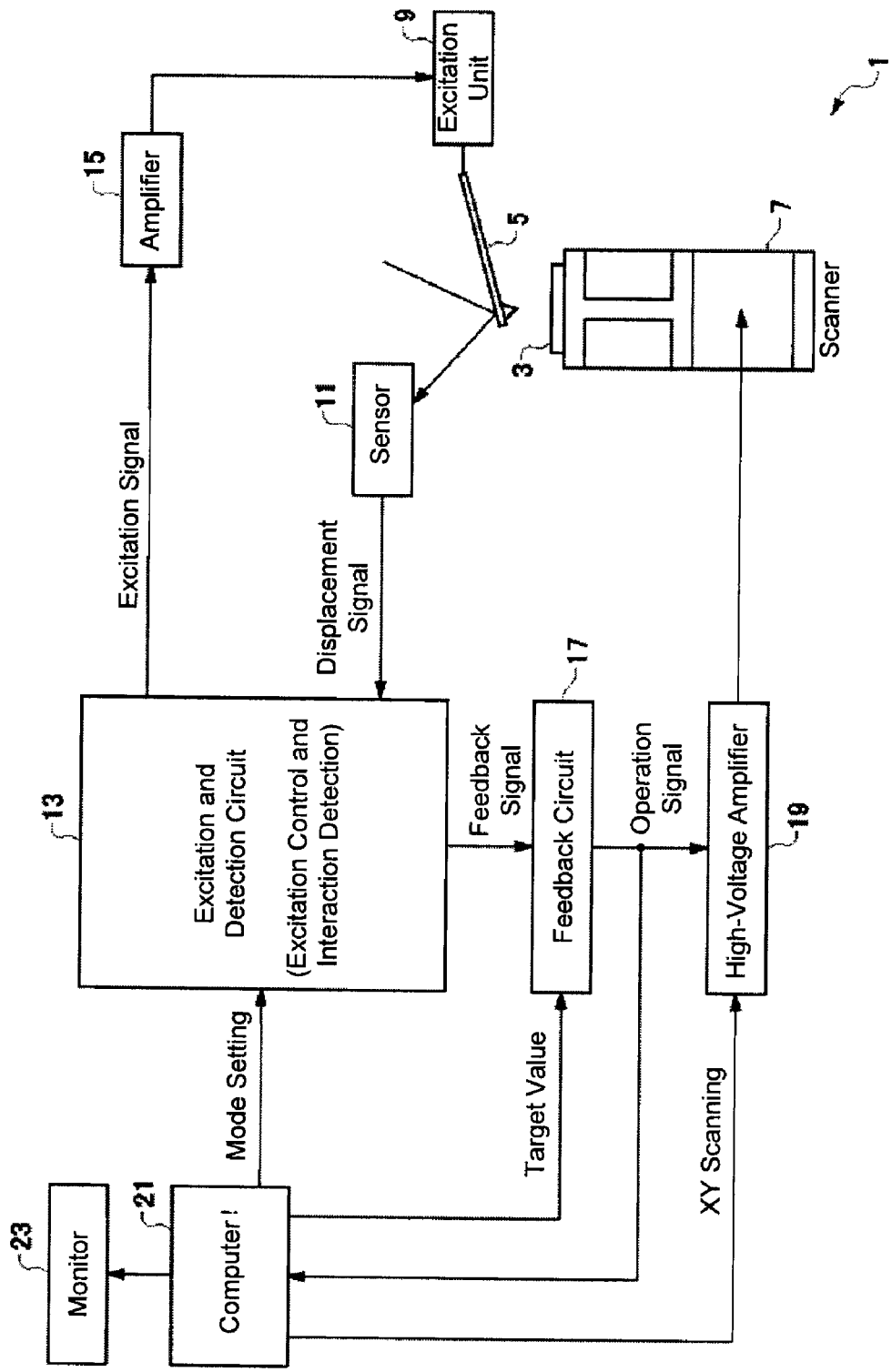
FIG. 5 is a diagram showing the general configuration of an AFM according to an embodiment of the present invention.

FIG. 5 shows the general configuration of an AFM. As described below, in the present embodiment, an AFM 1 is configured to be usable in an AM-AFM mode, a PM-AFM mode, and an FM-AFM mode and to be able to detect an amplitude signal, a phase difference signal, and a frequency signal as the amount of interaction between a probe and a sample. The amplitude signal, the phase difference signal, and the frequency signal are used for feedback control in the AM-AFM mode, the PM-AFM mode, and the FM-AFM mode, respectively.

As shown in FIG. 5, the AFM 1 includes a sample stage 3 on which a sample is held, and a cantilever 5 arranged in proximity to the sample. Furthermore, the AFM 1 includes a scanner 7, an excitation unit 9, a sensor 11, an excitation and detection circuit 13, an amplifier 15, a feedback circuit 17, and a high-voltage amplifier 19. Moreover, the AFM 1 includes a computer 21 configured to control the whole AFM, and a monitor 23.

The sample stage 3 is mounted on the scanner 7. The scanner 7 is a piezo scanner with a piezo element (piezoelectric element) serving as an actuator. The sample stage 3 is moved in an X direction, a Y direction, and a Z direction to scan the sample relative to the cantilever 5. The X and Y directions are orthogonal to each other on a horizontal plane. The Z direction is the vertical direction, which corresponds to the direction of recesses and protrusions on the sample (height direction). The cantilever 5 (probe device) is formed of silicon and includes a probe at a free end. The cantilever 5 is excited by the excitation unit 9. The excitation unit 9 is an actuator formed of a piezo element. However, the scanner 7 and the excitation unit 9 are not limited to piezo actuators. For example, a configuration using magnetism or light is applicable to scanning and excitation.

The sensor 11 detects displacement of the cantilever 5. Typically, the sensor 11 functions as an optical-lever displacement sensor together with a laser unit. Laser light is emitted by the laser unit and reflected by the cantilever 5 and reaches the sensor 11. The sensor 11 is a split diode sensor formed of photo diodes and outputs a displacement signal indicative of displacement of the cantilever 5. A position where the laser light is received is suitably detected as a displacement signal. The displacement signal is input to the excitation and detection circuit 13. In FIG. 5, optical system components such as lenses which are related to the sensor are omitted.

The excitation and detection circuit 13 is a digital circuit formed of a DSP or the like. The excitation and detection circuit 13 has a configuration corresponding to a combination of an excitation control circuit and an interaction detection circuit. The excitation and detection circuit 13 provides a function to control excitation of the cantilever 5 and a function to detect the probe-sample interaction amount. A characteristic configuration according to the present invention is provided in the excitation and detection circuit 13 as described below.

The excitation and detection circuit 13 performs excitation control by generating and outputting an excitation signal that excites the cantilever 5. The excitation signal is amplified by the amplifier 15, and the amplified signal is supplied to the excitation unit 9. Then, the excitation unit 9 excites the cantilever 5 in accordance with the excitation signal.

Furthermore, the excitation and detection circuit 13 detects the amount of the interaction between the probe and the sample based on the displacement signal input by the sensor 11. The interaction amount is a parameter indicative of the magnitude of the interaction between the cantilever 5 and the sample. The excitation and detection circuit 13 is configured to be able to detect the amplitude signal, the phase difference signal, and the frequency signal as a signal for the interaction amount. The excitation and detection circuit 13 outputs one of the three types of signals to the feedback circuit 17 as a feedback signal under the control of the computer 21. However, the excitation and detection circuit 13 may be configured to generate and output at least one of the three types of signals without departing from the scope of the present invention.

The feedback circuit 17 performs feedback control based on the feedback signal input by the excitation and detection circuit 13. Under the feedback control, the scanner 7 is driven in the Z direction so as to provide a constant feedback signal, thus keeping the interaction between the cantilever 5 and the sample constant. The feedback control also serves to keep the distance between the sample and the cantilever 5 constant. Such feedback control in the Z direction is also called Z scanning.

The feedback circuit 17 is formed of, for example, a PI control circuit to generate an operation signal for the Z direction such that the feedback signal equals a preset target value. The operation signal is a control signal allowing the scanner 7 to be driven in the Z direction. The operation signal is supplied to the high-voltage amplifier 19 and used to drive the scanner. The scanner 7 moves the sample stage 3 in the Z direction in accordance with the operation signal. As a result, the interaction between the sample and the cantilever 5 is kept constant.

The computer 21 controls the whole AFM 1. The computer 21 may be, for example, a personal computer. An AFM controlling board may be mounted in the computer 21. The excitation and detection circuit 13 may be mounted on the board.

The computer 21 can switch the operation mode of the AFM 1 between the AM-AFM mode and the PM-AFM mode and the FM-AFM mode.

In the AM-AFM mode, the computer 21 allows the excitation and detection circuit 13 to output the amplitude signal.

Furthermore, the computer 21 supplies an amplitude target value to the feedback circuit 17 to allow the feedback circuit 17 to perform feedback control adapted for the AM-AFM.

Similarly, in the PM-AFM mode, the computer 21 allows the excitation and detection circuit 13 to output the phase difference signal. Furthermore, the computer 21 supplies a phase difference target value to the feedback circuit 17 to allow the feedback circuit 17 to perform feedback control adapted for the PM-AFM.

Moreover, in the FM-AFM mode, the computer 21 allows the excitation and detection circuit 13 to output the frequency signal. Furthermore, the computer 21 supplies a frequency signal target value to the feedback circuit 17 to allow the feedback circuit 17 to perform feedback control adapted for the FM-AFM.

Additionally, the computer 21 controls the scanner 7 via the high-voltage amplifier 19 so that the scanner 7 performs scanning in the X and Y directions. Furthermore, the computer 21 provides a user interface function. A user inputs various instructions to the computer 21, which then controls the AFM 1 in accordance with the user's input. The user also inputs an instruction for the operation mode. Moreover, the computer 21 generates and outputs an image of the sample surface to a monitor 23.

Now, the general operation of the AFM 1 will be described. The scanner 7 is controlled by the computer 21 to scan the sample stage 3 in the X and Y directions. During the scanning in the X and Y directions, the excitation and detection circuit 13 supplies the excitation signal to the excitation unit 9 via the amplifier 15 to vibrate the cantilever 5 at a resonant frequency or any nearby frequency.

During the scanning in the X and Y directions, displacement of the cantilever 5 is detected by the sensor 11. A detection signal from the sensor 11 is processed by the excitation and detection circuit 13. Then, the amplitude signal, the phase difference signal, or the frequency signal is supplied to the feedback circuit 17 as a feedback signal. The feedback circuit 17 generates an operation signal allowing the scanner 7 to be driven in the Z direction so as to keep the feedback signal constant. The scanner 7 moves the sample stage 3 in the Z direction in accordance with the operation signal. Thus, the feedback signal and the distance between the cantilever 5 and the sample are kept constant.

As described above, the XY scanning is performed with the distance between the cantilever 5 and the sample kept constant. The operation signal for the Z direction in the feedback control is also supplied to the computer 21. The operation signal for the Z direction corresponds to the height of the sample in the Z direction. Furthermore, the position on the sample in the X and Y directions is controlled by the computer 21. Based on control data on the XY scanning and the input operation signal for the Z direction, the computer 21 generates and outputs an image of the sample surface on the monitor 23. A three-dimensional image is suitably generated and displayed.

The general configuration and operation of the AFM 1 have been described. In the above-described AFM 1, components such as the sensor 11, the excitation and detection circuit 13, and the feedback circuit 17 form a feedback loop for control of the probe-sample distance.

Figure 6:
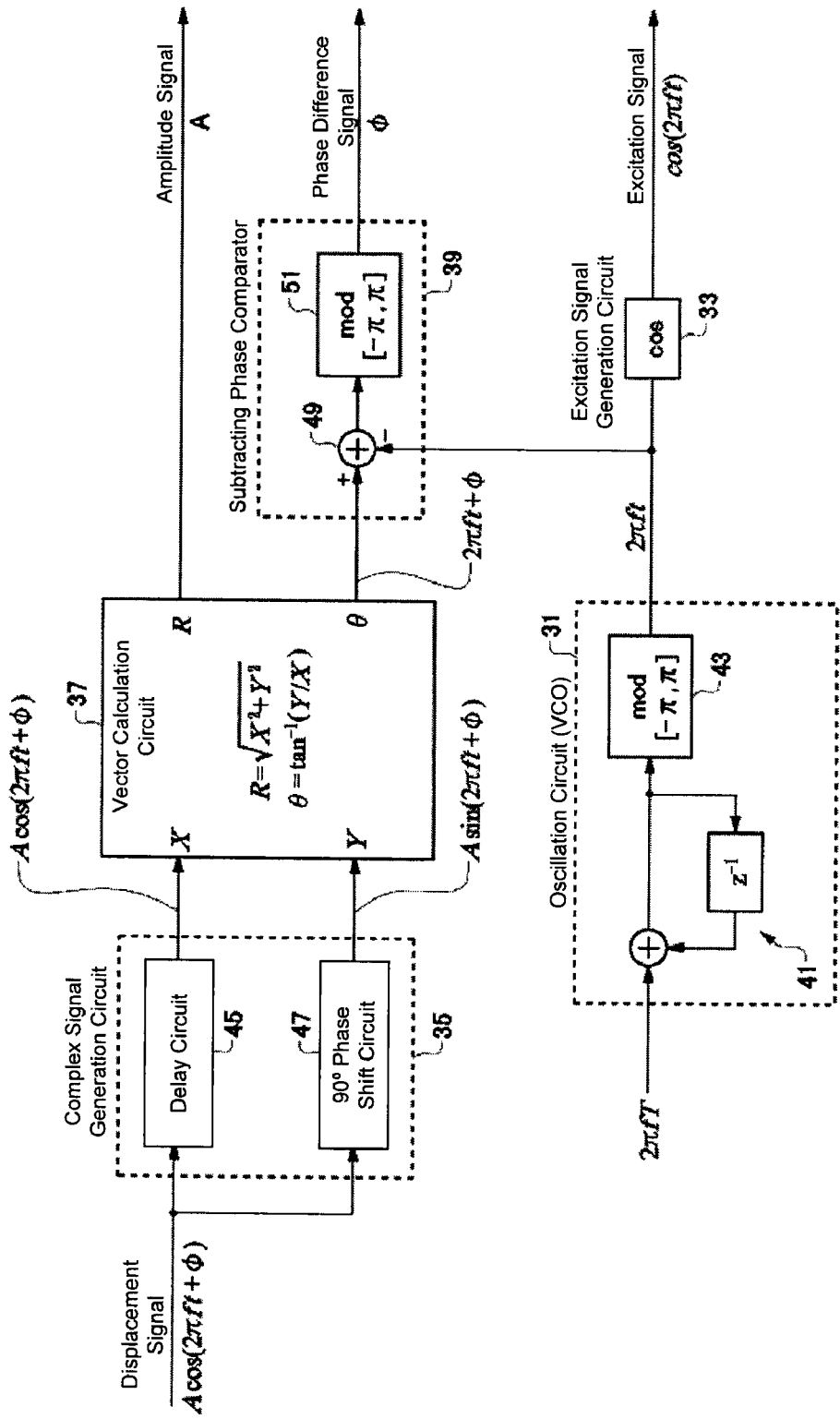
FIG. 6 is a diagram showing an excitation and detection circuit for an AM-AFM and a PM-AFM according to the present embodiment.
Figure 7:
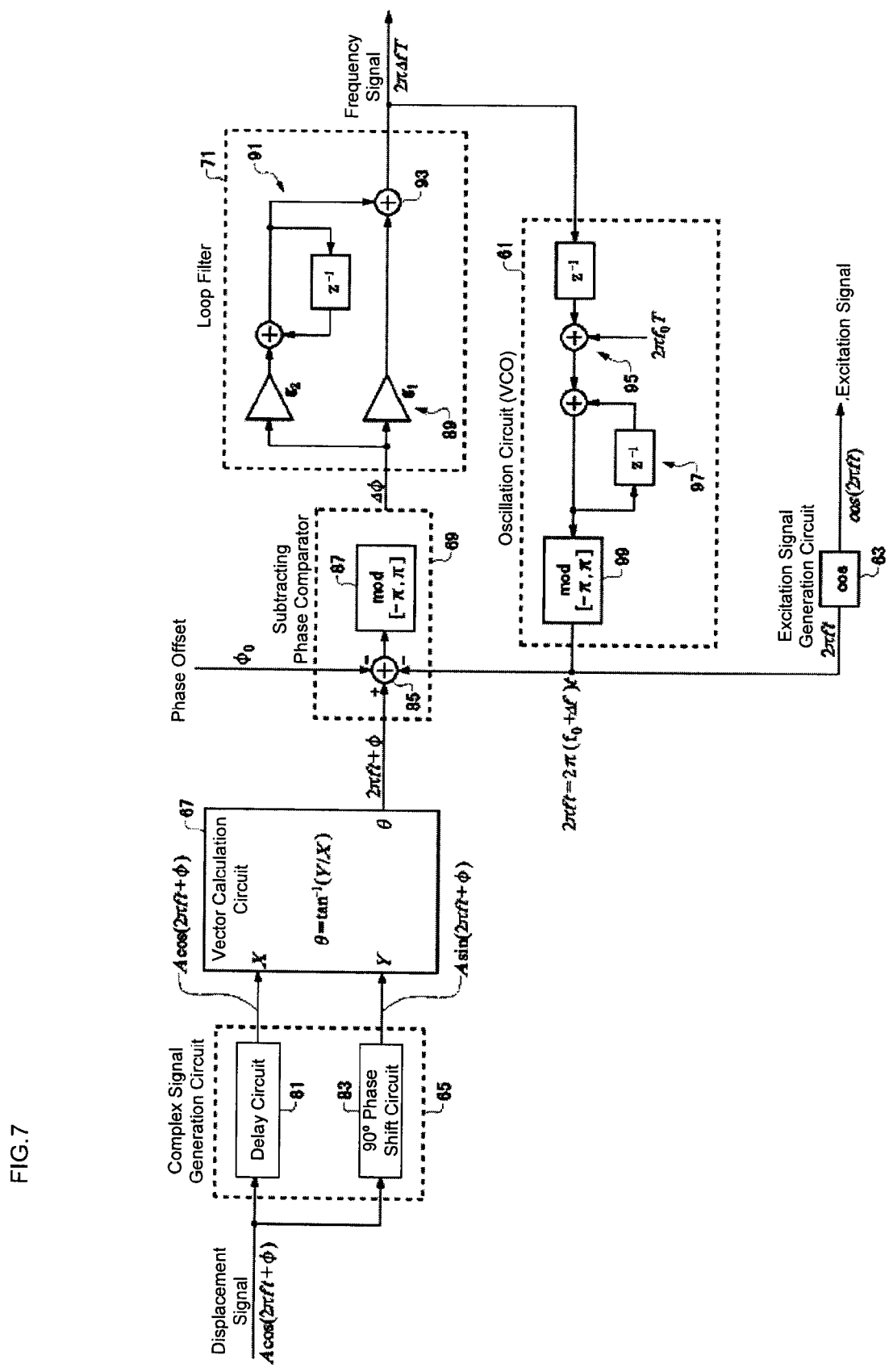
FIG. 7 is a diagram showing an excitation and detection circuit for an FM-AFM according to the present embodiment.

Now, the excitation and detection circuit 13, a characteristic component of the present invention, will be described with reference to FIG. 6 and FIG. 7. FIG. 6 shows a configuration for allowing the AFM 1 to operate in the AM-AFM mode and the PM-AFM mode to generate an amplitude signal and a phase difference signal. FIG. 7 shows a circuit configured to allow the AFM 1 to operate in the FM-AFM mode to generate a frequency signal. In the present embodiment, the configurations in FIG. 6 and FIG. 7 are both provided in the excitation and detection circuit 13. Under the control of the computer 21, an output from the excitation and detection circuit 13 is switched so as to output one of the amplitude signal, the phase difference signal, and the frequency signal in accordance with an operation mode.

First, the circuit for the AM-AFM mode and the PM-AFM mode will be described with reference to FIG. 6. As shown in FIG. 6, the excitation and detection circuit 13 includes an oscillation circuit 31 configured to generate an excitation phase signal indicative of the phase of an excitation signal, an excitation signal generation circuit 33 configured to generate an excitation signal from the excitation phase signal, a complex signal generation circuit 35 configured to generate a complex signal from a displacement signal, a vector calculation circuit 37 configured to calculate the absolute value and argument of the complex signal by vector calculation, and a subtracting phase comparator 39 configured to compare the phase of the argument with the phase of the excitation phase signal by subtraction.

Figure 8:
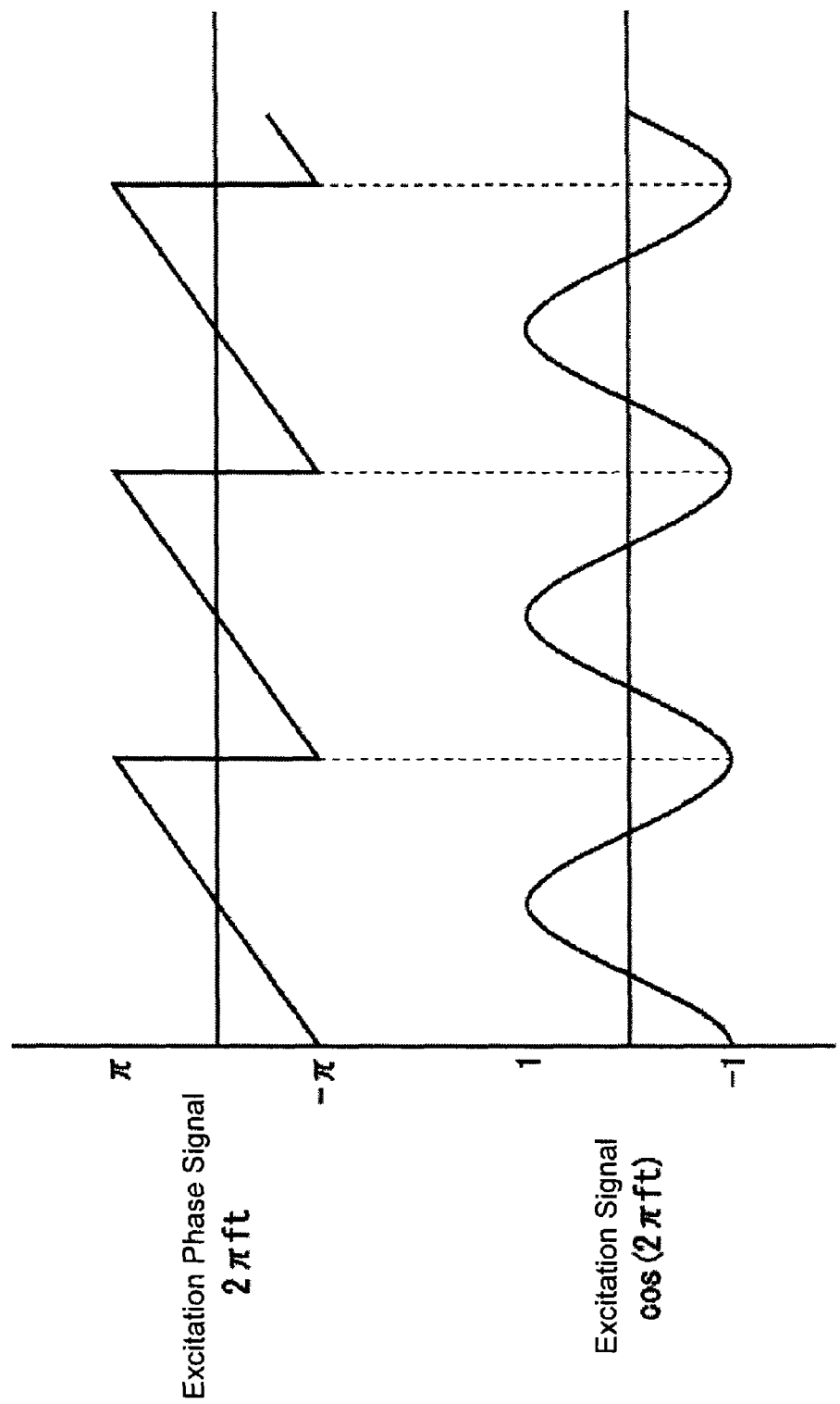
FIG. 8 is a diagram illustrating an excitation phase signal generated by an oscillation circuit and an excitation signal generated by an excitation signal generation circuit.

The oscillation circuit 31 generates an excitation phase signal $2\pi f t$ that varies at an excitation frequency f. The excitation phase signal is indicative of the phase of the excitation signal, and is input to the excitation signal generation circuit 33 and the subtracting phase comparator 39. The excitation signal generation circuit 33 converts the excitation phase signal $2\pi f t$ into an excitation signal $\cos(2\pi f t)$. FIG. 8 illustrates the excitation phase signal $2\pi f t$ generated by the oscillation circuit 31 and the excitation signal $\cos(2\pi f t)$ generated by the excitation signal generation circuit 33.

The oscillation circuit 31 and the excitation signal generation circuit 33 will be described in further detail. The oscillation circuit 31 is formed of a digital VCO (Voltage Controlled Oscillator). The signal $2\pi f T$ is input to the oscillation circuit 31, and reference character T denotes a sampling period. As shown in the circuit in FIG. 6, the digital VCO includes a loop 41 in which the input $2\pi f T$ is accumulated and which grows as corresponding signals are sequentially added together. The signal $2\pi f T$ is processed by a modulo calculation circuit 43. The modulo calculation circuit 43 divides an input value by $\pi$ and outputs the remainder. The modulo calculation circuit 43 limits an output range to $[-\pi, \pi]$. As a result, as shown in the upper part of FIG. 8, the excitation phase signal $2\pi f t$ has a waveform in which a linear increase from $-\pi$ to $\pi$ is periodically repeated.

The excitation signal generation circuit 33 is formed of a cosine function circuit. The excitation and detection circuit 13 holds sine-wave output values with respect to the phase, in the form of a lookup table. The excitation signal generation circuit 33 references the lookup table to interpolate discrete values in the table to obtain the excitation signal $\cos(2\pi f t)$. As a result, as shown in FIG. 8, the excitation signal $\cos(2\pi f t)$ is a cosine-wave signal with a phase corresponding to the excitation phase signal $2\pi f t$.

With reference again to FIG. 6, the complex signal generation circuit 35 includes a delay circuit 45 and a 90° phase shift circuit 47 (for example, a Hilbert conversion circuit). A displacement signal $A\cos(2\pi f t+\phi)$ from the cantilever 5 is input both to the delay circuit 45 and to the 90° phase shift circuit 47. The 90° phase shift circuit 47 lags the phase of the input signal by 90° to output the resultant signal $Y=A\sin(2\pi f t+\phi)$. The delay circuit 45 delays the input signal by the same duration as that in the 90° phase shift circuit 47 to output a signal $X=A\cos(2\pi f t+\phi)$. The signals X and Y correspond to complex signals.

The complex signals X and Y are input to the vector calculation circuit 37. The vector calculation circuit 37 calculates and outputs the absolute value R and argument θ of a complex signal X+jY. The absolute value R is $(X^2+Y^2)^{1/2}$, and the argument θ is $\tan^{-1}(Y/X)$. The absolute value R indicates the amplitude A of the displacement signal, and is output without any change as an amplitude signal.

On the other hand, the argument θ is input to the subtracting phase comparator 39. Furthermore, the subtracting phase comparator 39 receives the excitation phase signal 2πft from the oscillation circuit 31. The subtracting phase comparator 39 compares the argument θ with the excitation phase signal 2πft by subtraction. More specifically, as shown in FIG. 6, the subtracting phase comparator 39 includes a subtraction circuit 49 and a modulo calculation circuit 51. The subtraction circuit 49 determines the difference in phase between the argument θ and the excitation phase signal 2πft (φ=θ−2πft). Moreover, an output from the subtraction circuit 49 is processed by the modulo calculation circuit 51. The modulo calculation circuit 51 divides an input value by π and outputs the remainder to limit the output range to [−π, π].

As described above, the subtracting phase comparator 39 compares the argument θ with the phase of the excitation phase signal 2πft by subtraction. The result of the comparison by the subtracting phase comparator 39 corresponds to the phase difference φ between the excitation signal and the displacement signal, and is output as a phase difference signal.

Figure 3:
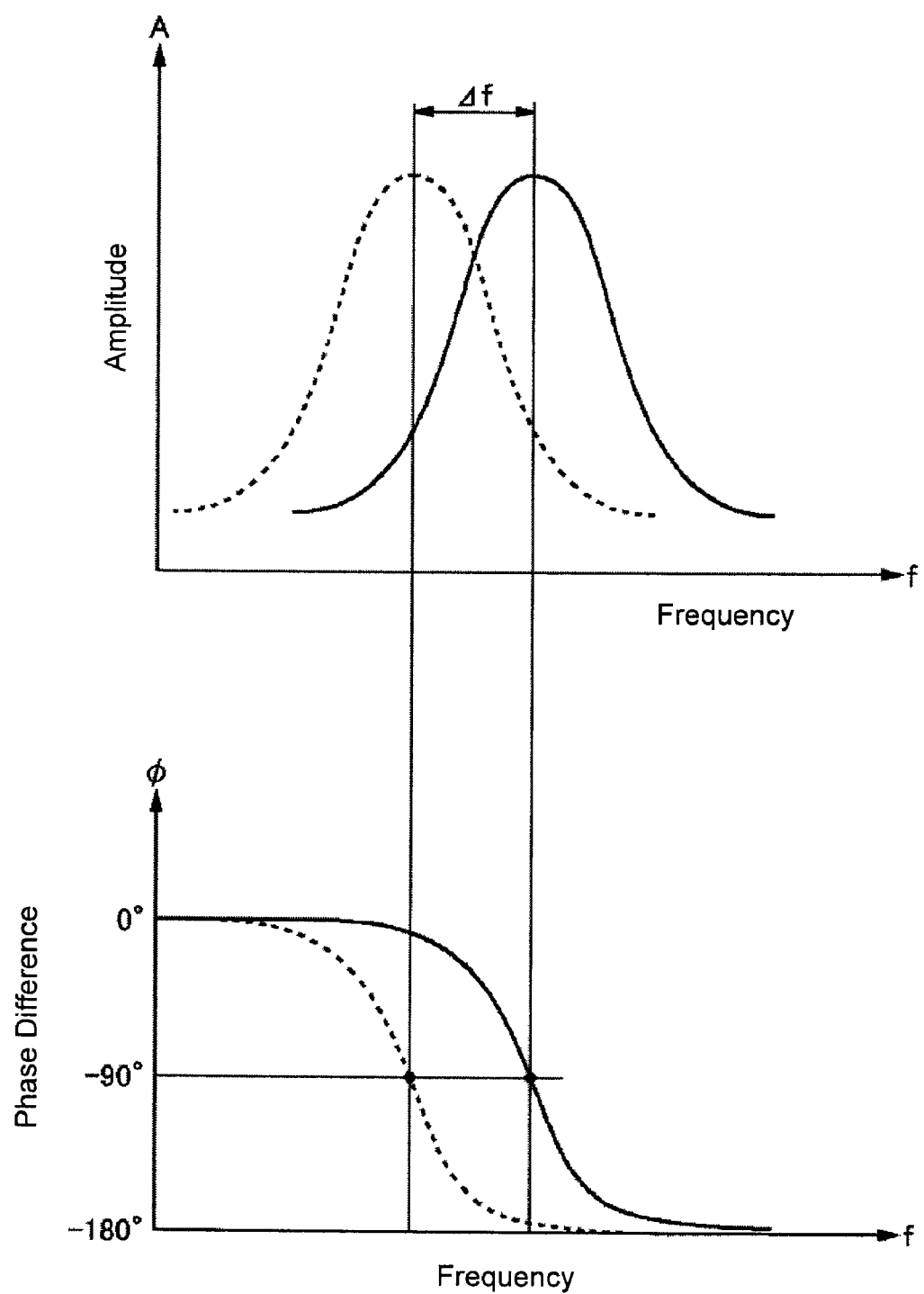
FIG. 3 is a diagram illustrating the principle of an FM-AFM.
Figure 4:
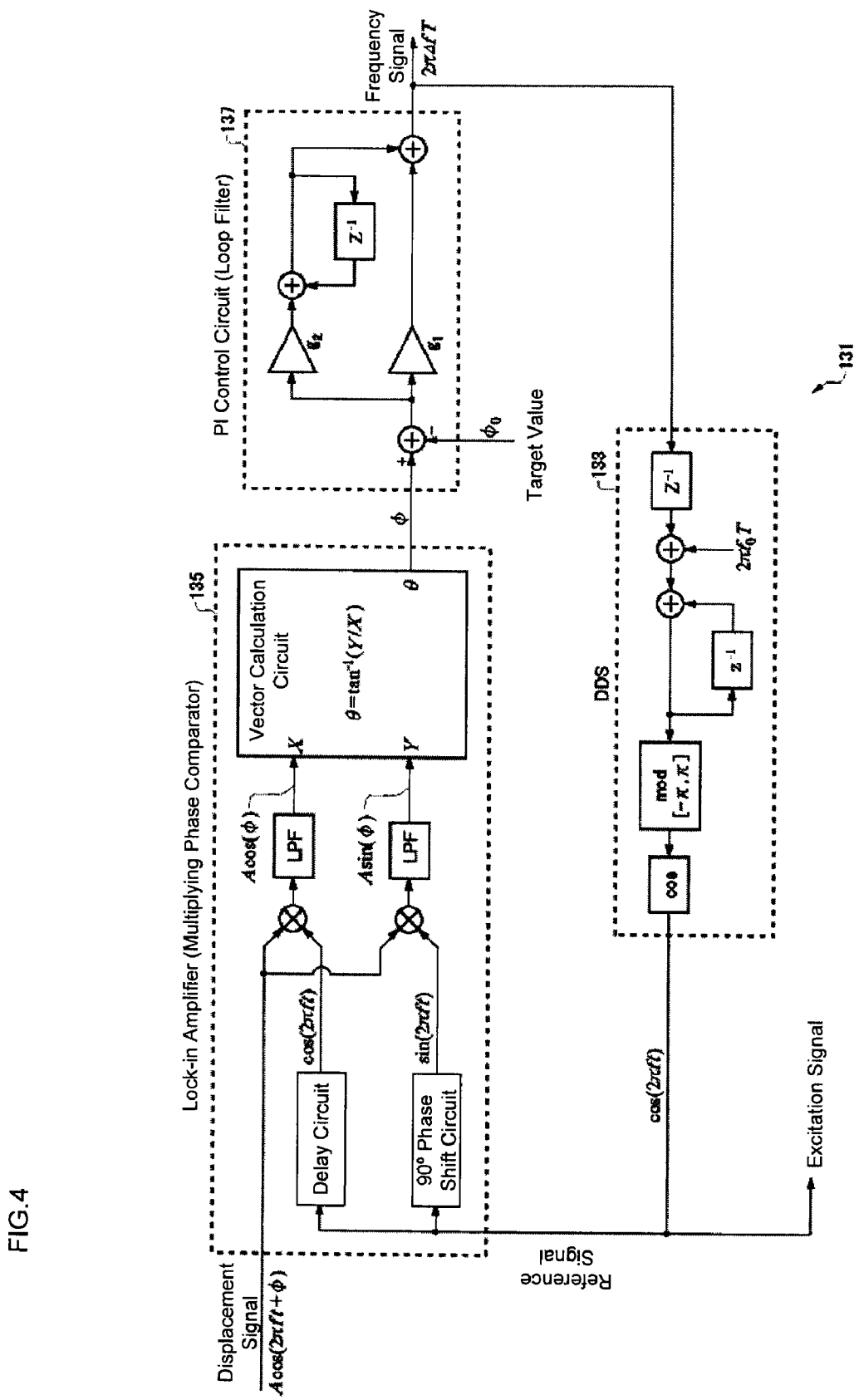
FIG. 4 is a diagram showing an excitation and detection circuit used in a conventional FM-AFM.

Now, the FM-AFM mode will be described. Here, before description of the circuit configuration in FIG. 7, the principle of the FM-AFM will be described again in brief with reference again to FIG. 3. As shown in FIG. 3, the resonant frequency f of the cantilever is varied by the interaction between the cantilever and the sample (Δf in the upper graph). Furthermore, when the cantilever vibrates at the resonant frequency, the phase difference φ between the excitation signal and the displacement signal is 90° (lower graph). Thus, the FM-AFM uses the phase locked loop (PLL) circuit to control the excitation signal so that the phase difference φ equals a target value φ0=90°. During the excitation control, a resonant frequency variation Δf is detected. Then, feedback control is performed so as to keep the resonant frequency variation Δf constant. Based on this principle of the FM-AFM, the circuit configuration in FIG. 7 will be described.

As shown in FIG. 7, the excitation and detection circuit 13 generally includes an oscillation circuit 61 configured to generate an excitation phase signal indicative of the phase of an excitation signal, an excitation signal generation circuit 63 configured to generate an excitation signal from the excitation phase signal, a complex signal generation circuit 65 configured to generate a complex signal from a displacement signal, a vector calculation circuit 67 configured to calculate the argument of the complex signal by vector calculation, a subtracting phase comparator 69, and a loop filter 71 configured to control the oscillation circuit 61 based on an output from the subtracting phase comparator 69. The oscillation circuit 61, the subtracting phase comparator 69, and the loop filter 71 form a PLL circuit. The PLL circuit controls the oscillation circuit 61 so that the difference between the argument and the excitation phase signal equals a predetermined phase offset (phase difference target value). The PLL circuit further generates a frequency signal obtained by PLL control and which is indicative of a variation in the frequency of the displacement signal. Thus, the above-described configuration allows the excitation control of the FM-AFM and the detection of frequencies to be achieved. The configuration in FIG. 7 will be described below in detail.

The complex signal generation circuit 65 in FIG. 7 is configured similarly to the complex signal generation circuit 35 in FIG. 6. The complex signal generation circuit 65 includes a delay circuit 81 and a 90° phase shift circuit 83. The displacement signal Acos(2πft+φ) from the cantilever 5 is input both to the delay circuit 81 and to the 90° phase shift circuit 83. The 90° phase shift circuit 83 lags the phase of the input signal by 90° to output the resultant signal Y=Asin(2πft+φ). The delay circuit 81 delays the input signal by the same duration as that in the 90° phase shift circuit 83 to output the signal X=Acos(2πft+φ). The signals X and Y correspond to complex signals.

The complex signals X and Y are input to the vector calculation circuit 67. The vector calculation circuit 67 calculates and outputs the argument θ of the complex signal X+jY. The argument θ is $\tan^{-1}(Y/X)$. The vector calculation circuit 67 is configured similarly to the vector calculation circuit in FIG. 6 but calculates only the argument θ, which is required for the FM-AFM. However, the vector calculation circuit 67 may of course calculate the absolute values of the complex signals without departing from the scope of the present invention.

The vector calculation circuit 67 inputs the argument θ to the subtracting phase comparator 69. The subtracting phase comparator 69 further receives the excitation phase signal 2πft from the oscillation circuit 61 and also receives a phase offset φ0. The phase offset φ0 is a target value for the difference in phase between the excitation signal and the displacement signal as described above. The phase offset φ0 is set to 90°.

The subtracting phase comparator 69 compares the argument θ with the phases of the excitation phase signal 2πft and the phase offset φ0 by subtraction. A value obtained by subtracting the excitation phase signal 2πft from the argument θ corresponds to the phase difference φ between the excitation signal and the displacement signal (φ=θ−2πft). The subtracting phase comparator 69 further subtracts the phase offset φ0 from the phase difference φ to obtain a value Δφ (Δφ=θ−2πft−φ0=φ−φ0). Thus, a comparator output Δφ is indicative of the difference between the phase difference φ and the phase offset φ0.

A comparator output Δφ is input to the loop filter 71. The loop filter 71 transmits an output 2πΔfT to the oscillation circuit 61 (reference character T denotes a sampling period for input and output signals). The loop filter 71 adjusts the output 2πΔfT so as to zero the comparator output Δφ. The oscillation circuit 61 varies the oscillation frequency f of the excitation signal 2πft, an output from the oscillation circuit 61, depending on a variation in input 2πΔfT. The oscillation frequency f deviates from the free-running frequency f0 (the oscillation frequency obtained when the input is 0) by Δf.

In the configuration in FIG. 7, the oscillation circuit 61, the subtracting phase comparator 69, and the loop filter 71 form a PLL circuit. The value of Δf varies such that the frequency of the displacement signal equals that of the excitation signal, that is, f=f0+Δf. Thus, the output value 2πΔft from the loop filter 71 is proportional to a variation in the frequency of the displacement signal. This signal is output as a frequency signal.

Furthermore, the difference in phase between the displacement signal and the excitation signal can be adjusted by varying the value of the phase offset φ0. As described above with reference to FIG. 3, in the FM-AFM, the phase offset φ0 is set to 90°. This maintains the phase difference φ at 90° to allow the cantilever to vibrate at the resonant frequency. Even when the resonant frequency is varied by the interaction between the cantilever and the sample, the cantilever continues to vibrate at the resonant frequency. Thus, the frequency signal has a value indicative of a variation (shift) $\Delta f$ in the resonant frequency of the cantilever, and is used for feedback control.

The subtracting phase comparator 69, loop filter 71, oscillation circuit 61, and oscillation signal generation circuit 63 in FIG. 7 will be described in further detail. The subtracting phase comparator 69 includes a subtraction circuit 85 and a modulo calculation circuit 87. The subtraction circuit 85 carries out phase comparison by subtraction to subtract the excitation phase signal $2\pi ft$ and the phase offset $\phi 0$ from the argument $\theta$. The result of the subtraction is input to the modulo calculation circuit 87. The modulo calculation circuit 87 divides the input value by it to output the remainder. This limits the range of the comparator output $\Delta\phi$ to $[-\pi, \pi]$.

As described above, the loop filter 71 controls the output $2\pi\Delta fT$ so as to zero the comparator output $\Delta\phi$. To achieve this control, the loop filter 71 generates a value (reference numeral 89) by multiplying the comparator output $\Delta\phi$ by a gain and also generates a value (reference numeral 91) by multiplying the integral value of the comparator output $\Delta\phi$ by the gain. Then, an adder 93 adds these values together. In the above description, the comparator output $\Delta\phi$ is indicative of the difference between the phase difference $\phi$ and the phase offset $\phi 0$. The loop filter 71 carries out a proportional and integral process so as to zero the comparator output $\Delta\phi$. This means that the subtracting phase comparator 69 and the loop filter 71 function as a PI control circuit so as to make the phase difference $\phi$ equal to the phase offset $\phi 0$. The output $2\pi\Delta fT$ from the loop filter 71 is proportional to a variation in the frequency of the displacement signal and is thus used as a frequency signal.

The oscillation circuit 61 is formed of a digital VCO (voltage controlled oscillator). The oscillation circuit 61 receives a signal $2\pi\Delta f0T$ corresponding to the free-running frequency f0 and an output $2\pi\Delta ft$ from the loop filter 71. Then, $2\pi f0t$ and $2\pi\Delta ft$ are added together by an adder 95, and outputs from the adder 95 are accumulated in a loop 97. The accumulated signals are processed by a modulo calculation circuit 99. The modulo calculation circuit 99 divides an input value by $\pi$ to output the remainder. This limits the output range to $[-\pi, \pi]$.

The excitation phase signal $2\pi ft$, the output from the oscillation circuit 61, has a waveform in which a linear increase from $-\pi$ to $\pi$ is periodically repeated as shown in FIG. 8. However, the frequency f is f0+$\Delta f$. The excitation phase signal $2\pi ft$ ($=2\pi(f0+\Delta f)t$) is supplied to the subtracting phase comparator 69 and the excitation signal generation circuit 63. The excitation signal generation circuit 63 is configured similarly to the excitation signal generation circuit 33 in FIG. 6, and is a cosine function circuit. The excitation signal generation circuit 63 references a lookup table that specifies sine-wave output values with respect to the phase. The excitation signal generation circuit 63 thus interpolates discreet values in the table to generate an excitation signal $\cos(2\pi ft)$.

Figure 2:
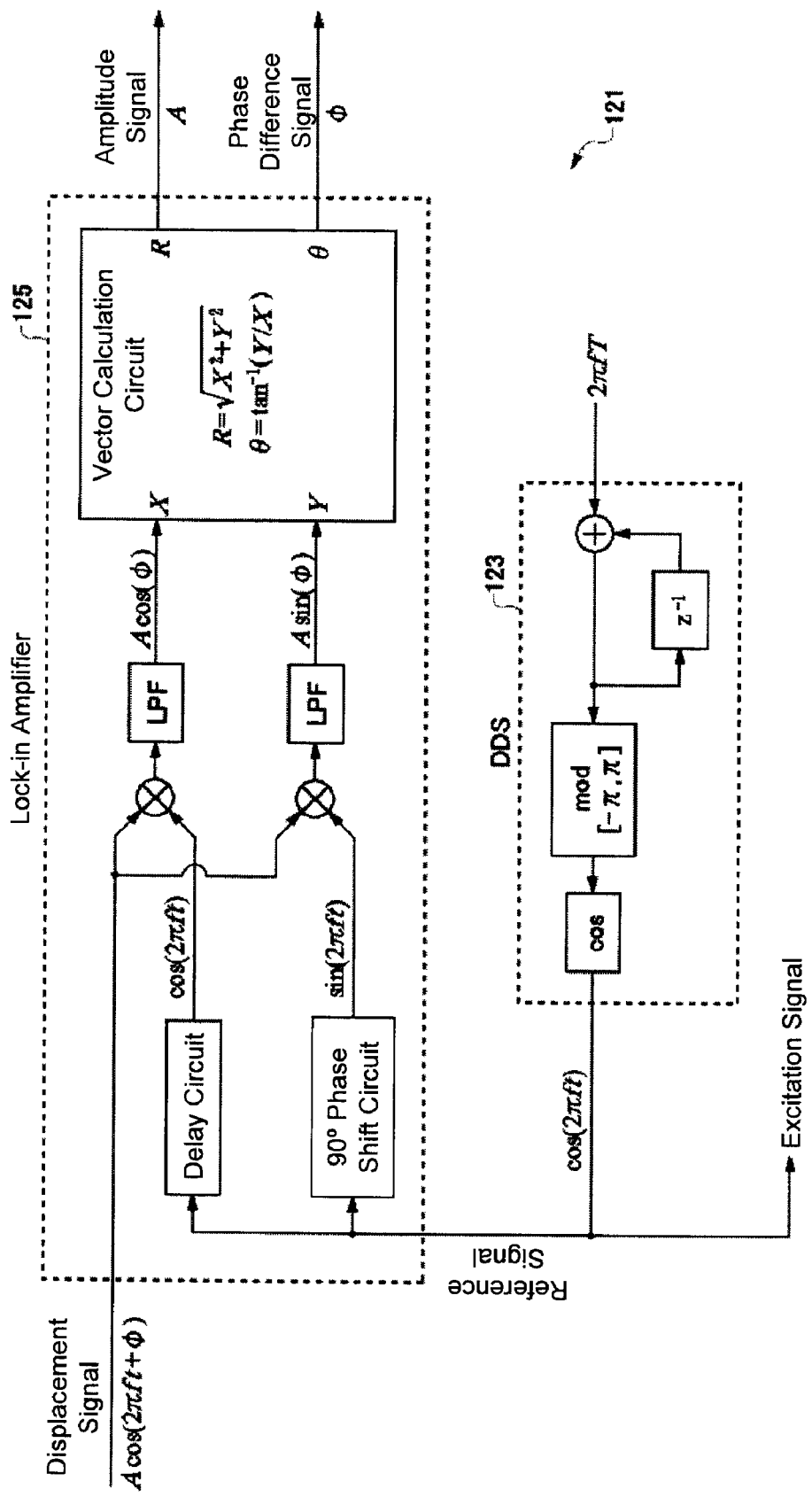
FIG. 2 is a diagram showing an excitation and detection circuit used in a conventional AM-AFM and a conventional PM-AFM.

The characteristic configuration of the present invention has been described with reference to FIG. 6 and FIG. 7. Now, the difference in configuration between the present invention and the conventional art will be described through comparison. First, the circuit in FIG. 6 is compared with the circuit according to the conventional technique in FIG. 2. To generate a complex signal from the displacement signal, the conventional technique illustrated in FIG. 2 uses the excitation signal as a reference signal to remove a phase component from the excitation signal. This processing uses multiplication.

The present invention generates a complex signal directly from the displacement signal without using the excitation signal as a reference signal, and processes the complex signal by vector calculation. Even in this case, the absolute value of the complex signal can be utilized as an amplitude signal without any change.

Furthermore, the phase component of the excitation signal is not removed from the complex signal. Thus, the argument resulting from the vector calculation not only contains the difference in phase between the displacement signal and the excitation signal but also still contains the phase of the excitation signal. The phase of the excitation signal corresponds to the phase of the excitation phase signal for the oscillation circuit 13. Thus, the present invention uses the subtracting phase comparator 39 to carry out subtractive comparison on the argument and the excitation phase signal to remove the phase of the excitation signal from the argument. As a result of the subtraction process, the phase difference $\phi$ between the displacement signal and the excitation signal remains.

The processing according to the present invention avoids carrying out multiplication in generating a complex signal as described above. The processing according to the present invention is thus advantageous compared to the conventional technique, which requires multiplication. As described above, according to the conventional technique, the multiplication between the displacement signal and the excitation signal involves an unwanted harmonic component. A signal mixed with the harmonic component is processed in the feedback loop for control of the probe-sample distance of the AFM. In this case, the feedback gain needs to be limited to a small value in order to avoid oscillation at the frequency of the harmonic component. This conventionally constitutes a factor preventing fast and stable feedback control from being achieved. In contrast, in the configuration according to the present invention, the subtracting phase comparator 39 carries out phase comparison instead of multiplication. Hence, the feedback gain can be increased to achieve fast and stable feedback control.

Like the circuit in FIG. 6, the circuit in FIG. 7 uses the subtracting phase comparator to avoid carrying out multiplication. This allows the harmonic component problem resulting from the multiplication to be avoided. In particular, for the FM-AFM, this configuration not only enables an increase in the feedback gain of Z scanning but is also advantageous for the PLL circuit. This will be described below in further detail.

In contrast to the AM-AFM and the PM-AFM, the FM-AFM uses the PLL circuit. In the conventional technique, a harmonic component is generated in the loop in the PLL circuit. The harmonic component cannot completely be removed even by an LPF. In particular, the LPF is present in the PLL and is thus subject to another restriction; the LPF cannot be designed independently of the response characteristics of the PLL. Thus, removal of the harmonic component in the FM-AFM is more difficult than in the AM-AFM and the PM-AFM. Because of the residual harmonic component, an increase in the gain of the PLL causes the PLL circuit to oscillate at the frequency of the residual harmonic component. Thus, in the conventional technique, the gain of the PLL is limited, precluding the frequency from being detected quickly and stably. On the other hand, the present invention prevents generation of a harmonic component, allowing the PLL circuit to be configured to operate at a higher speed. As a result, the frequency can be detected quickly and stably.

Figure 9:
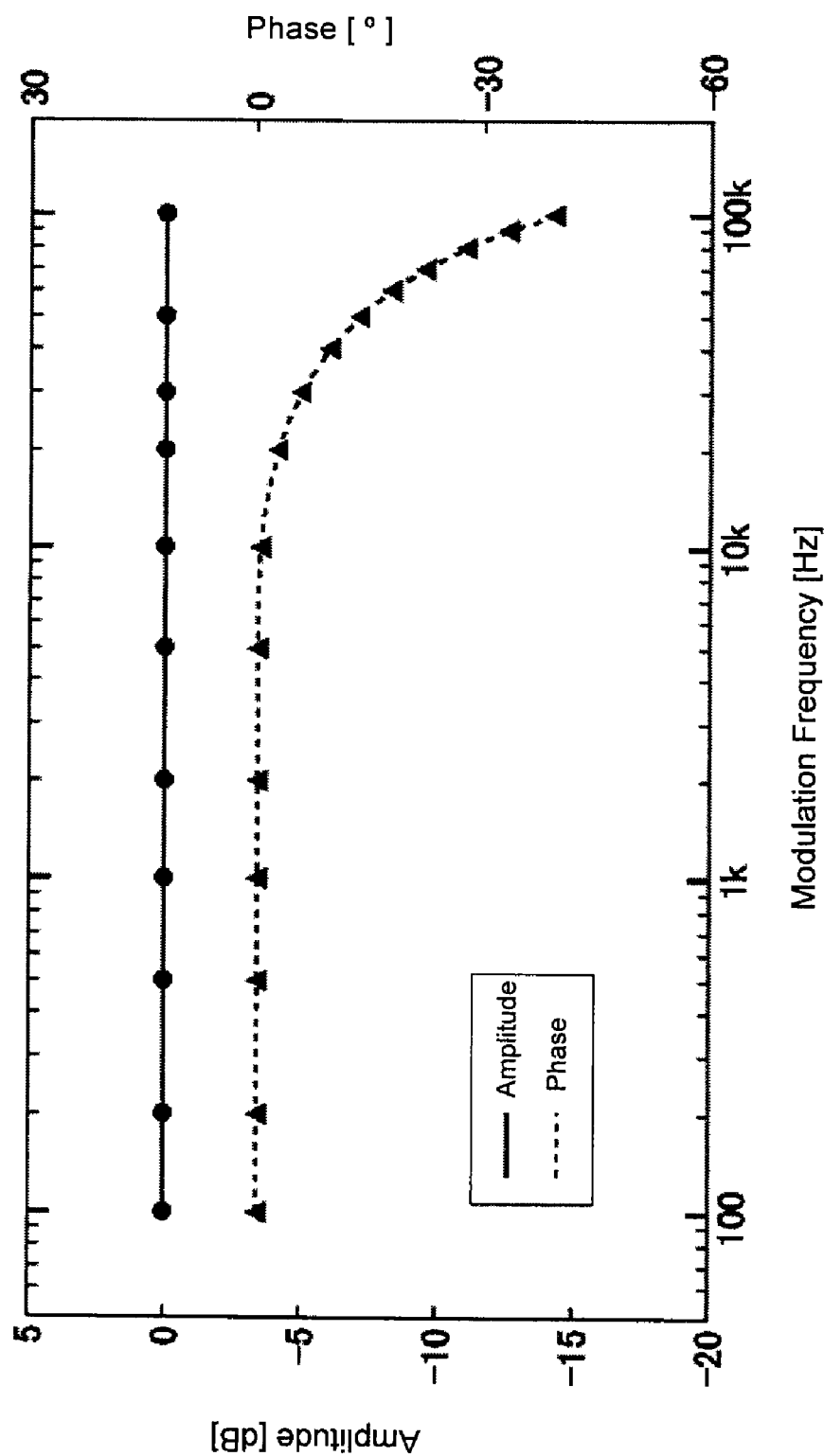
FIG. 9 is a diagram showing the results of measurement of demodulation signal amplitude/phase-modulation frequency characteristics of an FM-AFM circuit according to the present embodiment.

FIG. 9 illustrates the results of measurement of the demodulation signal amplitude/phase-modulation frequency characteristics of the FM-AFM configuration in FIG. 7. As illustrated in FIG. 9, the amplitude of a demodulation signal is almost constant over a wide band from 100 Hz to 100 kHz, resulting in a demodulation band of at least 100 kHz. In the FM-AFM, a detector is incorporated into the feedback loop. Thus, a delay time in the feedback loop may affect the feedback band. Also in this regard, in FIG. 9, phase lag is about 40° at 100 kHz, resulting in a delay time of about 1.1 μs. These characteristics have been drastically improved by conventional PLL digital circuits.

Now, an example in which the AFM 1 according to the present embodiment is applied will be described. The AFM 1 may include a first frequency conversion circuit configured to convert the frequency of the displacement signal before the excitation and detection circuit 13 carries out processing, and a second frequency conversion circuit configured to convert the frequency of the excitation signal generated by the excitation and detection circuit 13. The second frequency conversion circuit may perform conversion opposite to that carried out by the first frequency conversion circuit. The first frequency conversion circuit may be called a preprocess frequency conversion circuit. The second frequency conversion circuit may be called an excitation frequency conversion circuit. Each of the first and second frequency conversion circuits may be provided inside or outside the excitation and detection circuit. Each of the first and second frequency conversion circuits may be a heterodyne frequency converter.

As described above, the first and second frequency conversion circuits carry out the opposite conversions. The frequency conversions are, for example, an addition and a subtraction. The displacement signal is subjected to addition or subtraction of a predetermined frequency. The excitation signal is subjected to subtraction or addition of the same frequency. However, the frequency conversions are not limited to the addition and subtraction. Such frequency conversions allow the excitation and detection circuit to be applied to a cantilever with a wide range of resonant frequencies. Even when the excitation and detection circuit 13 is a digital circuit with a fixed frequency, cantilevers with different resonant frequencies can be used for the excitation and detection circuit 13.

As described above, the scanning probe microscope according to the present invention includes a subtracting phase comparator, and uses, for feedback control, the interaction amount obtained using the subtracting phase comparator. The scanning probe microscope according to the present invention avoids the use of multiplication based on multiplying phase comparison as carried out in the conventional technique. This prevents generation of a harmonic component resulting from the multiplication. Therefore, problems attributed to the harmonic component can be avoided.

For example, the configuration in FIG. 6 allows generation of a harmonic component to be avoided, enabling an increase in the feedback gain in the feedback control of the probe-sample distance. Thus, a fast-operating and stable scanning probe microscope can be provided.

Furthermore, for example, the configuration in FIG. 7 enables an increase not only in feedback gain but also in the gain of the PLL. Therefore, a scanning probe microscope with a faster-operating PLL circuit can be provided.

The currently possible preferred embodiment of the present invention has been described. However, it should be appreciated that many variations may be made to the present embodiment. The accompanying claims are intended to embrace all such variations falling within the spirit of truth of and the scope of the present invention.

INDUSTRIAL APPLICABILITY

As described above, the present invention is useful as a scanning probe microscope such as an atomic force microscope.

The invention claimed is:

1. A scanning probe microscope comprising:
a probe device;
an excitation unit which excites the probe device;
a sensor which detects a displacement signal from the probe device;
a feedback circuit which performs feedback control so as to keep interaction between the probe device and a sample constant; and
an excitation and detection circuit which generates an excitation signal controlling excitation carried out by the excitation unit and which detects, for feedback control, an interaction amount indicative of the interaction based on the displacement signal,
the excitation and detection circuit comprising:
an oscillation circuit which generates an excitation phase signal indicative of a phase of the excitation signal;
an excitation signal generation circuit which generates the excitation signal based on the excitation phase signal;
a complex signal generation circuit which generates a complex signal based on the displacement signal;
a vector calculation circuit which calculates an argument of the complex signal by vector calculation; and
a subtracting phase comparator which compares the argument with the phase of the excitation phase signal by subtraction,
wherein a signal for the interaction amount obtained using the subtracting phase comparator is supplied to the feedback circuit.

2. The scanning probe microscope according to claim 1, wherein
the subtracting phase comparator compares the argument with the excitation phase signal to generate the phase difference signal for the excitation signal and the displacement signal, and
the excitation and detection circuit supplies the phase difference signal to the feedback circuit as the interaction amount.

3. The scanning probe microscope according to claim 1, wherein the excitation and detection circuit comprises a loop filter forming a phase locked loop circuit together with the oscillation circuit and the subtracting phase comparator, wherein
the phase locked loop circuit controls the oscillation circuit so that a difference in phase between the argument and the excitation phase signal equals a predetermined phase offset, and generates a frequency signal obtained by a phase locked loop and which is indicative of a variation in a frequency of the displacement signal, and wherein
the excitation and detection circuit supplies the frequency signal to the feedback circuit as the interaction amount.

4. The scanning probe microscope according to claim 3, wherein
the subtracting phase comparator compares the argument with the excitation phase signal and the phase offset by subtraction, wherein
the loop filter generates the frequency signal based on an output from the subtracting phase comparator, and wherein
the frequency signal is used by the oscillation circuit and for the feedback control.

5. The scanning probe microscope according to claim 1, wherein
the vector calculation circuit calculates an absolute value of the complex signal which serves as an amplitude signal for the displacement signal, and the excitation and detection circuit supplies the amplitude signal to the feedback circuit as the interaction amount.

6. The scanning probe microscope according to claim 1, further comprising:
a first frequency conversion circuit which converts a frequency of the displacement signal before the excitation and detection circuit carries out processing; and
a second frequency conversion circuit which converts the frequency of the excitation signal generated by the excitation and detection circuit, wherein
the second frequency conversion circuit performs conversion opposite to conversion carried out by the first frequency conversion circuit.

7. A scanning probe microscope comprising:
a probe device;
an excitation unit which excites the probe device;
a sensor which detects a displacement signal from the probe device;
a feedback circuit which performs feedback control so as to keep constant a difference in phase between an excitation signal and the displacement signal whose difference varies depending on interaction between the probe device and a sample; and
an excitation and detection circuit which generates the excitation signal controlling excitation carried out by the excitation unit and which detects, for feedback control, a phase difference signal indicative of the phase difference based on the displacement signal,
the excitation and detection circuit comprising:
an oscillation circuit which generates an excitation phase signal indicative of a phase of the excitation signal;
an excitation signal generation circuit which generates the excitation signal based on the excitation phase signal;
a complex signal generation circuit which generates a complex signal based on the displacement signal;
a vector calculation circuit which calculates an argument of the complex signal by vector calculation; and
a subtracting phase comparator which compares the argument with the phase of the excitation phase signal by subtraction to generate a phase difference signal.

8. A scanning probe microscope comprising:
a probe device;
an excitation unit which excites the probe device;
a sensor which detects a displacement signal for the probe device;
a feedback circuit which performs feedback control so as to keep constant a variation in frequency of the displacement signal corresponding to interaction between the probe device and a sample; and
an excitation and detection circuit which generates an excitation signal controlling excitation carried out by the excitation unit and which detects, for feedback control, a frequency signal indicative of the variation in frequency based on the displacement signal,
the excitation and detection circuit comprising:
an oscillation circuit which generates an excitation phase signal indicative of a phase of the excitation signal;
an excitation signal generation circuit which generates the excitation signal based on the excitation phase signal;
a complex signal generation circuit which generates a complex signal based on the displacement signal;
a vector calculation circuit which calculates an argument of the complex signal by vector calculation;
a subtracting phase comparator which compares the argument with the phases of the excitation phase signal and a predetermined phase offset by subtraction; and
a loop filter which forms a phase locked loop circuit together with the oscillation circuit and the subtracting phase comparator, wherein
the phase locked loop circuit controls the oscillation circuit so that a difference in phase between the argument and the excitation phase signal equals the predetermined phase offset and
the excitation and detection circuit supplies the frequency signal obtained by the phase locked loop to the feedback circuit.

9. A scanning probe microscope comprising:
a probe device,
an excitation unit which excites the probe device;
a sensor which detects a displacement signal for the probe device;
a feedback circuit which performs feedback control so as to keep constant an amplitude of the displacement signal varying depending on interaction between the probe device and a sample; and
an excitation and detection circuit which generates an excitation signal controlling excitation carried out by the excitation unit and which detects, for feedback control, an amplitude signal indicative of the amplitude based on the displacement signal,
the excitation and detection circuit comprising:
an oscillation circuit which generates an excitation phase signal indicative of a phase of the excitation signal;
an excitation signal generation circuit which generates the excitation signal based on the excitation phase signal;
a complex signal generation circuit which generates a complex signal based on the displacement signal; and
a vector calculation circuit which calculates an absolute value of the complex signal which serves as the amplitude signal for the displacement signal.

10. A method for controlling a scanning probe microscope which controls excitation of a probe device by an excitation signal, detect a displacement signal for the probe device, and perform feedback control so as to keep interaction between the probe device and a sample constant based on the displacement signal,
the method comprising:
generating an excitation phase signal indicative of a phase of the excitation signal;
generating the excitation signal based on the excitation phase signal;
generating a complex signal based on the displacement signal;
calculating an argument of the complex signal by vector calculation;
processing the argument and the excitation phase signal using a subtracting phase comparator; and
performing feedback control using an interaction amount obtained using the subtracting phase comparator and which is indicative of the interaction.

* * * * *

UNITED STATES PATENT AND TRADEMARK OFFICE
CERTIFICATE OF CORRECTION

PATENT NO. : 8,387,159 B2  
APPLICATION NO. : 13/060373  
DATED : February 26, 2013  
INVENTOR(S) : Takeshi Fukuma and Yuji Mitani Page 1 of 1

It is certified that error appears in the above-identified patent and that said Letters Patent is hereby corrected as shown below:

Title page, (73) Assignees should read as follows:

-- National University Corporation Kanazawa University, Kanazawi-shi (JP) --.

Signed and Sealed this  
Twenty-third Day of July, 2013

Teresa Stanek Rea  
*Acting Director of the United States Patent and Trademark Office*

UNITED STATES PATENT AND TRADEMARK OFFICE
CERTIFICATE OF CORRECTION

PATENT NO.      : 8,387,159 B2  
APPLICATION NO. : 13/060373  
DATED           : February 26, 2013  
INVENTOR(S)     : Fukuma et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this

First Day of September, 2015

Michelle K. Lee
*Director of the United States Patent and Trademark Office*